(No Model.)
E. M. GARDNER.
GALVANIC BATTERY.
No. 342,508. Patented May 25, 1886.
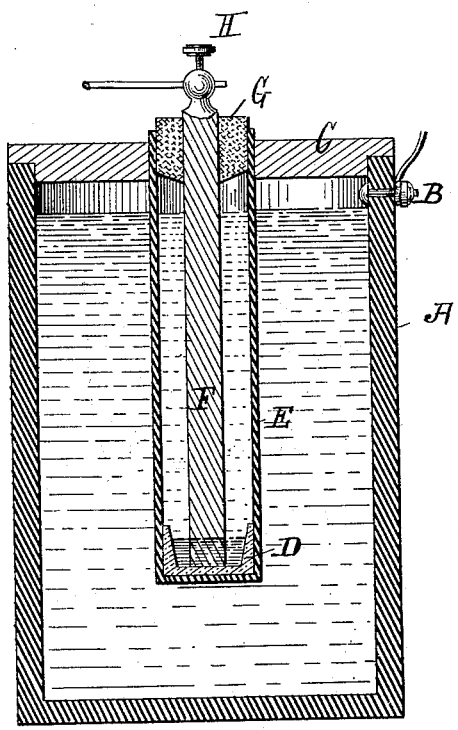
WITNESSES
C. W. Benjamin
W. E. Dodson
INVENTOR
Ernest M. Gardner
by Park Benjamin.
his Atty.

UNITED STATES PATENT OFFICE.

ERNEST M. GARDNER, OF BROOKLINE, MASSACHUSETTS.

GALVANIC BATTERY.

SPECIFICATION forming part of Letters Patent No. 342,508, dated May 25, 1886.

Application filed October 22, 1885. Serial No. 180,567. (No model.)

*To all whom it may concern:*

Be it known that I, ERNEST M. GARDNER, of Brookline, Massachusetts, have invented a new and useful Improvement in Galvanic Batteries, of which the following is a specification.

My invention relates to a primary galvanic cell containing a metal electrode—preferably zinc—a carbon electrode, a porous partition of carbon, and suitable exciting and depolarizing fluids.

My invention consists more particularly in forming the containing-vessel of the cell of carbon, which acts as an electrode, and in the combination of the several parts of the cell, as hereinafter more particularly set forth.

In the accompanying drawing is shown a vertical section of my improved cell.

A is the containing-vessel, which is made wholly of carbon.

In order to prevent leakage of the fluids through the pores of the carbon, I cover the outer surface of the vessel A with shellac, rubber varnish, soluble glass, or any other suitable material which will fill the exterior pores, and so render the vessel liquid-tight. The vessel A is preferably of cylindrical form. Near its upper portion I attach in any convenient way a binding-screw, B, to which one of the terminal wires of the cell is secured.

C is a lid or cover, of wood, glass, or other insulating material, which rests upon and closes the vessel A. Supported in any convenient way, as by cement, in an aperture in said cover is a vessel, E, of cylindrical form, made of hard finely-porous carbon.

In the lower portion of the vessel E, I may place a shallow glass cup, D, containing mercury. In said mercury enters the lower end of the zinc electrode F, which is thus kept amalgamated. The zinc electrode F is supported in a plug, G, of rubber, cork, wood, or other insulating material, inserted and fitting tightly in the end of the vessel E.

To the electrode F is attached a binding-screw, H, in which is secured a terminal wire of the cell.

In the vessel E, I place any suitable exciting-fluid—such as acidulated water—and in the vessel A any suitable depolarizing-fluid—such a bichromate-of-potash solution.

I claim—

In a galvanic cell, the combination of the vessel A, of carbon, constituting one electrode of the cell, porous-carbon vessel E, cover C, electrode F, plug G, fluids, and circuit connections, substantially as described.

ERNEST M. GARDNER.

Witnesses:
   A. A. WILSON,
   JAMES L. LITTLE, Jr.